United States Patent Office 3,485,816
Patented Dec. 23, 1969

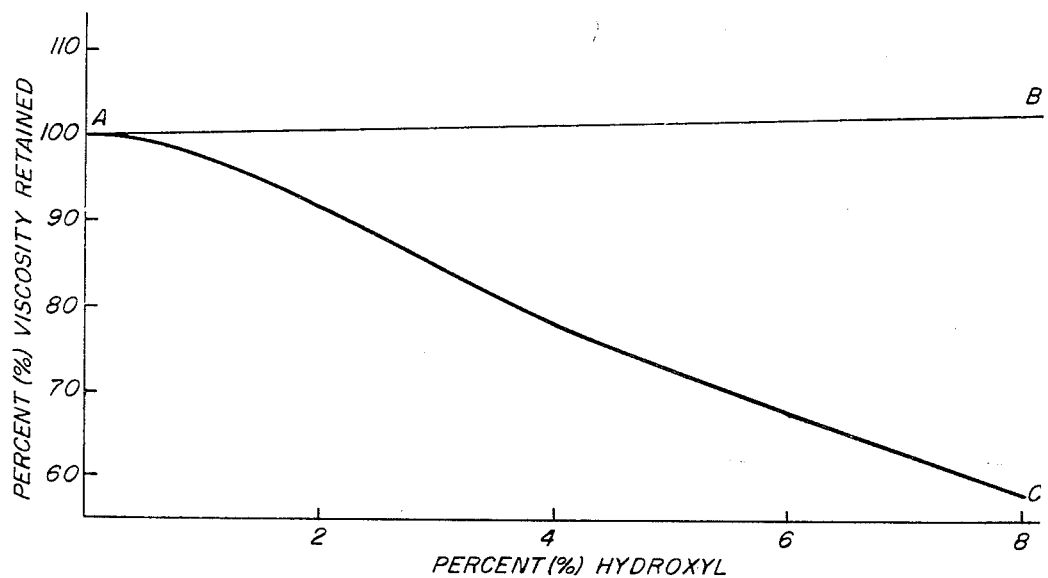

3,485,816
METHOD FOR HYDROLYZING CELLULOSE TRI-ESTERS WITHOUT VISCOSITY LOSS AND FOR MANUFACTURING TOLUENE SOLUBLE CELLULOSE BUTYRATE
Carlton L. Crane and Carl J. Malm, Rochester, N.Y., assignors to Eastman Kodak Company, Rochester, N.Y., a corporation of New Jersey
Filed May 1, 1967, Ser. No. 635,225
Int. Cl. C08b *3/10, 3/24;* C09d *3/14*
U.S. Cl. 260—225         11 Claims

ABSTRACT OF THE DISCLOSURE

Certain butyrate esters of cellulose have been found to be substantially completely soluble in toluene, the solvent presently used most extensively in high quality lacquers. The valuable butyrate esters contain at least about 51.5% butyryl and between about 1% and about 3% hydroxyl, the ratio of primary hydroxyl to secondary hydroxyl being at most about 1 to 1.5.

These butyrate esters can be manufactured via a special process that involves heating a solution of (a) cellulose butyrate containing greater than 52% butyryl, 0 to 1.5% acetyl, 0–0.25% hydroxyl and at most about 0.006% combined sulfate and (b) at most about 30% water, dissolved in a butyric acid solvent system (that contains no sulfuric acid or fatty acid anhydride) until the percent hydroxyl is substantially increased.

This process, which results in very little to no loss in viscosity of the cellulosic material during the hydrolysis step, is also broadly useful in hydrolyzing cellulose esters without excessive loss of their intrinsic viscosities.

---

This invention relates to lacquers, and more particularly to lacquers containing special butyrate esters of cellulose having unique solubility properties in toluene, and to methods for preparing such special butyrate esters of cellulose.

The special butyrate esters of cellulose of this invention are those having at least about 51.5% (and preferably from about 51.5% to 55.5%) butyryl, an intrinsic viscosity of from about 0.05 to about 1.8 (and preferably from about 0.1 to about 1.2), from 0 to about 1.5% (preferably less than 1%) of fatty acid radicals containing 2–3 carbon atoms (such as acetyl and/or propionyl) and from about 1% to about 3.2% hydroxyl (preferably from about 1.5% to about 3% hydroxyl); the ratio of primary hydroxyl to secondary hydroxyl being at most about 1 to 1.5, and preferably between about 1 to 1.3 and about 1 to 0.5.

It has been found that these particular butyrate esters of cellulose have the unique ability to form solutions in toluene (the solvent that is presently being used most extensively in high quality lacquers) that are practically completely free of insoluble specks. Cellulose butyrates having such valuable solubility properties were not known heretofore. Apparently, only those cellulose esters having the combination of special substituents detailed above have these unique solubility properties.

At the presen ttime only one method is known for manufacturing cellulose butyrates having the unique properties described above. That is, by utilizing a special type of hydrolysis step in combination with a special type of cellulose butyrate starting material. The starting material, first of all, must contain at least about 52% butyryl, as little as practical (but at most about 1.5%) acetyl and/or propionyl, at most about 0.25% hydroxyl, and they must be practically free of combined sulfate (they can contain at most about 0.006%, and preferably should contain at most about 0.003%, sulfur as combined sulfate). Such starting materials can themselves be manufactured in accordance with the processes described in U.S. Patent 3,047,561, issued to C. L. Crane.

Secondly, the hydrolysis must be undertaken while the cellulose butyrate starting materials are dissolved in butyric acid, that is essentially free of fatty acid anhydrides and also essentially free of dissolved sulfate ions and contains as much as about 30 weight percent of free water. Thus, the amount of water in the hydrolysis bath must be at least enough to convert any anhydride type material to the corresponding acid (and thereby reach at least the so-called "glacial point"). Preferably between about 0.5 and about 15 weight percent of free water (over the "glacial point") should be present in the hydrolysis bath at the outset of the hydrolysis processes of this invention. The water in the hydrolysis bath, too, must be dissolved in the fatty acid. It can, of course, be added to the hydrolysis bath as hot or cold water, or even steam, initially and/or during the hydrolysis step.

Hydrolysis begins when the solution of (a) special (very low sulfate) cellulose butyrate and (b) water in the lower fatty acid is warmed to about 75° F. or above, and can be conducted at practically any temperature above this. However, due to undesirable color development at temperatures above about 300° F., generally this figure represents a practical maximum, while temperatures of the hydrolysis bath between about 100° F. and about 250° F. are preferred. Generally, the higher the hydrolysis temperature, the faster the hydrolysis. For the manufacture of the cellulose butyrates of this invention, then, the hydrolysis need simply be continued until the percent hydroxyl is increased to within the desired range, as set out above.

By utilizing the processes of the present invention, the ratio of primary hydroxyl in the resulting product is significantly lower than would ordinarily be expected. Thus, in conventional hydrolysis processes, generally the ratio of primary to secondary hydroxyl is about 2 to 1, whereby in the practice of the present processes it is an unexpected advantage to be able to produce materials (within the hydroxyl range described above) believed to have significantly lower ratios of primary to secondary hydroxyl (for example, within the range of from about 1 to 1.5 to about 1 to 0.25; preferably within the range of from about 1 to 1.3 to about 1 to 0.5 for optimum solubility of the cellulose butyrates in toluene). Also, the processes of this invention have the surprising and extremely valuable ability to promote a substantial degree of hydrolysis without the usual and expected substantial degree of degradation of the cellulose molecule (demonstrated by a significant loss in intrinsic viscosity). This particular benefit is illustrated in the drawing, wherein curve AC illustrates a typical conventional cellulose butyrate hydrolysis process (with about 2% "free" water) while curve AB illustrates a typical cellulose butyrate hydrolysis process of the present invention as exemplified in greater detail in Example I, below. The curves in the drawing show the effect of hydrolysis processes upon the intrinsic viscosity of the cellulose butyrate (versus percent hydroxyl over a period of time). The starting material in each instance had the same intrinsic viscosity (1.1), the same percent butyryl (55%) and the same acetyl (0.5%).

The benefits relating to the specific ratios of primary to secondary hydroxyl described above and to retention of intrinsic viscosity are not limited to butyrates, but are indeed obtainable by hydrolyzing other cellulose triesters (having the necessary very low hydroxyl and very low combined sulfur in the ester initially, as detailed above) that can be dissolved in aqueous lower fatty acid hydrolysis baths at the prescribed temperatures. This includes acetates, isobutyrates, propionates, phthalates, valerates, and mixtures thereof, as well as many others.

Lacquers made from the butyric esters of the present invention, sometimes containing resins and plasticizers, can be applied with excellent results to a wide variety of substrates such as plywood paneling, furniture, automobile bodies and structural aluminum. Such lacquers can be applied by any suitable technique, such as brushing or spraying. They are composed of a film-forming portion and a solvent portion, the film-forming portion consisting essentially of 60–100% of film former and 0–40% of plasticizer, at least about 30% by weight of the film former being one of (or a mixture of more than one of) the butyric esters of cellulose of the present invention, and substantially the remainder of the film-forming portion being a resin which is both soluble in toluene (and the "solvent portion") and compatible with the cellulose butyrate. Such "compatible" solvents include (but are not limited to) xylene, methylene chloride, styrene, acetone, isobutyl acetate, proprietary solvents that consist mainly of ethanol, mixtures of xylene with isopropanol, butanol and the like, and mixtures thereof.

The "solvent portion" of the lacquers of this invention generally contain at least about 50 weight percent of toluene, and preferably consist essentially of toluene. Other solvents compatible with this system can, of course, also be utilized in relatively minor amounts; for example, generally in amounts equal to at most about 25 weight percent, based on the weight of the "solvent portion" each.

In the following examples, all parts are by weight unless otherwise specified.

EXAMPLE I

Into a conventional jacketed sigma bladed stainless steel mixer are placed 15 parts of cotton linters and 14 parts of butyric acid. While this mixture is stirred, a total of 67 parts of butyric anhydride are added. The mass is then cooled to 40° F. To this cooled mixture are then added a mixture consisting of 0.3 part of sulfuric acid and 0.7 part of butyric acid. The temperature of the resulting esterification bath is then allowed to rise gradually (over about 15 hours) to about 85° F. Then a slurry consisting of about 0.5 part of magnesium carbonate and 4 parts of butyric acid are blended into the clear, viscous esterified mass. The temperature of this mass is then raised quickly to about 250° F., and the ester is held at this temperature for about 4 hours. At this point the cellulose butyrate contains only 0.07% hydroxyl, only about 0.003% combined sulfur (calculated as sulfate), and about 55.5% butyryl.

At the end of this time, the solution is cooled to about 150° F. Nine parts thereof are then diluted with 30 parts glacial acetic acid and again with 30 parts of 80% acetic acid (in water). The resulting mixture is then filtered, and finally blended, with stirring into 150 parts of 25% aqueous acetic acid, whereby the cellulose tributyrate is precipitated from solution. The precipitate is then drained, washed with a multiplicity of changes of distilled water. This material is then boiled in distilled water containing 0.002 part oxalic acid per part cellulose butyrate for 1 hour, drained, and finally washed 5 times with water (until it is substantially free from uncombined acids). The resulting raw material for the hydrolysis step analyzes 55% butyryl, 0.5% acetyl, and 0.07% hydroxyl.

To the balance of the 150° F. solution are added (over a period of 30 minutes) a mixture of 9.2 parts distilled water and 10.3 parts butyric acid. The resulting blend is then heated to 220° F. (reflux temperature) and maintained at reflux for about 60 hours. During this time, samples are removed after 8, 16, 24, 48, and 60 hours and diluted, precipitated and processed in the manner described above with respect to the "nine parts" of the 150° F. material. In Table I, below, solubility and viscosity data for these materials are tabulated. At the end of 36 hours, the ratio of primary to secondary hydroxyl is found to be about 1:1.

TABLE I

| Hydrolysis time, hours | Intrinsic viscosity [1] | Percent Hydroxyl | Percent Ash | Solubility in Toluol [2] |
|---|---|---|---|---|
| 0 | 1.1 | 0.07 | 0.01 | Insoluble. |
| 8 | 1.18 | 0.85 | 0.02 | Almost soluble. |
| 16 | 1.23 | 1.7 | 0.02 | Soluble. |
| 24 | 1.25 | 2.2 | 0.014 | Do. |
| 36 | 1.26 | 2.9 | 0.015 | Do. |
| 48 | 1.26 | 3.3 | 0.016 | Almost soluble. |
| 60 | 1.26 | 3.5 | 0.008 | Insoluble. |

[1] In 9:1 methylene chloride/methanol.
[2] 20 weight percent of cellulose ester, 80 weight percent toluol.

EXAMPLE II

A lacquer is prepared from one of the samples removed from the hydrolysis process of Example I (after 36 hours from the hydrolysis process of Example I (after 36 hours) as follows:

Nine parts of this "36 hour" hydrolyzed cellulose butyrate (52.4% butyryl, 0% acetyl, 2.9% hydroxyl having a primary to secondary ratio of about 1:1, and only 0.003% combined sulfur, and an intrinsic viscosity of about 1.26), 13 parts of butylated urea-formaldehyde resin (60% concentration of resin in a 60:40 butanol-xylene solution), 80 parts of toluene, and 2 parts of dioctyl phthalate plasticizer are blended until a clear solution results. It is surprising that a clear solution can result, since heretofore such completely soluble (in toluene) cellulose butyrates were believed to be unobtainable, although such soluble butyrates were desired and actively sought for many years.

The lacquer thus obtained is brush applied in 3 coats onto birch and fir plywoods and dried at room temperature for 24 hours after each coat. The dried coating is free from tack, clear, glossy, adheres well to the plywood, and is resistant to both room temperature and boiling water, whiskey, and acetone.

The film-forming portion of the present invention can be solely one or more of the special cellulose butyrates of this invention (described in detail aobve). However, it may be advantageous in certain instances to incorporate various modifiers compatible with the cellulose ester and the solvent solution. Particularly good results may be obtained by incorporating cross-linking agents, such as alkylated urea or melamine formaldehyde resins, the alkyl groups of which contain 1 to 10 carbon atoms, hexamethoxymethyl melamine, an alkyl titanate, the alkyl groups of which contain 1 to 18 carbon atoms, an organic isocyanate, such as toluene-2,4-diisocyanate, or a polyisocyanate. Any resin may be incorporated in the film-forming portion so long as the resin is compatible with the cellulose esters employed in the invention. Such resins include oxidized alkyd resins, oil soluble phenolic resins, polyvinyl acetate, polyvinyl acetal, polyvinyl buta, polyvinyl chloride, polyvinyl chloride-acetate, touene sulfonamide-formaldehyde resins, acrylic resins, liquid type epoxy resins, chlorinated diphenyl resins, rosin and its derivatives, and polydimethylsiloxane.

The film-forming portion of the lacquers in accordance with our invention may contain up to 40% (preferably 5–25%), based on the total quantity of film-forming ingredients, of any suitable plasticizer.

It is to be understood that the lacquer compositions as described above and as defined in the appended claims may have customary modifiers and addenda incorporated therein, including pigments, dyes, ultraviolet absorbers, antioxidants, fungicides and catalysts to promote cross-linking between the cellulose ester and cross-linking agents, when such are incorporated in the lacquer.

This invention has been described in detail with particular reference to preferred embodiments thereof, but it will be understood that variations and modifications can be effected within the spirit and scope of the invention as described hereinabove and as defined in the appended claims.

We claim:
1. A process for manufacturing toluene soluble cellulose butyrate, which process comprises the step of heating a mixture of
   (a) cellulose butyrate containing at least about 52% butyryl, 0–1.5% acetyl, at most about 0.25% hydroxyl, and at most about 0.006% sulfur as combined sulfate and
   (b) at most about 30% of free water, based on the weight of the liquids in the hydrolysis bath, dissolved in a solvent system consisting essentially of butyric acid at a temperature of from about 75° F. to about 300° F. until the percent hydroxyl of said cellulose butyrate is increased to within the range of from about 1% to about 3.2% hydroxyl; said mixture being substantially free of sulfuric acid and free of fatty acid anhydrides.

2. Cellulose butyrate having an intrinsic viscosity between about 0.05 and about 1.8, a butyryl content of at least about 51.5%, and a hydroxyl content of from about 1% to about 3.2%, the ratio of primary hydroxyl to secondary hydroxyl being at most about 1 to 1.5; said cellulose butyrate having been made by the process of claim 1.

3. A lacquer composition comprising a film-forming portion and a solvent portion, the film-forming portion consisting essentially of 60–100% film former and 0–40% plasticizer; at least about 30% of said film-forming portion being cellulose butyrate containing at least about 51.5% butyryl and from about 1% to about 3.2% hydroxyl; the ratio of primary hydroxyl to secondary hydroxyl being at most about 1 to 1.5, respectively; and substantially the remainder of said film-forming portion being selected from the group consisting of resins soluble in toluene and compatible with said cellulose butyrate; said solvent portion consisting essentially of toluene and said cellulose butyrate having been made by the process of claim 1.

4. A lacquer composition as in claim 3, wherein said cellulose butyrate contains from about 51.5% to about 55.5% butyryl, from 0 to about 1.5 percent fatty acid radicals having 2–3 carbon atoms, and from about 1.5 to about 3% hydroxyl; the ratio of primary hydroxyl to secondary hydroxyl in said cellulose butyrate being between about 1 to 1.3 and about 1 to 0.5.

5. A lacquer composition as in claim 4, wherein said film former consists essentially of said cellulose butyrate.

6. A process as in claim 1, wherein said heating is conducted at temperatures within the range of from about 100° F. to about 250° F.

7. Cellulose butyrate having an intrinsic viscosity between about 0.1 and about 1.2, a butyryl content of from about 51.5% to about 55.5%, a hydroxyl content of from about 1.5% to about 3%, and at most about 0.006% sulfur, as combined sulfate; the ratio of primary hydroxyl to secondary hydroxyl in said cellulose butyrate being between about 1 to 1.3 and about 1 to 0.5; said cellulose butyrate having been made by the process of claim 6.

8. A lacquer composed of a film-forming portion and a solvent portion; said film-forming portion consisting of about 40% cellulose butyrate made by the process of claim 6 and containing about 52.4% butyryl, at most about 1% acetyl, and about 2.9% hydroxyl; the ratio of primary hydroxyl to secondary hydroxyl in said cellulose butyrate being about 1:1, respectively; and about 10% plasticizer; and said solvent portion consisting essentially of toluene.

9. A process for hydrolyzing a cellulose triester without substantial loss of viscosity, which process comprises heating at temperatures within the range of from about 75° F. to about 300° F. a mixture of
   (a) a cellulose triester having less than 0.25% hydroxyl and at most about 0.006% sulfur as combined sulfate, and
   (b) between about 0.5 and about 30 weight percent of water, based on the weight of volatile liquids in said mixture,
dissolved in a solvent system that is substantially free of sulfuric acid and consists essentially of at least one lower fatty acid; said heating being conducted for a period of time sufficient to significantly increase the amount of hydroxyl in said cellulose triester; said cellulose triester containing ester portions selected from the group consisting of acetate, butyrate, isobutyrate, propionate, phthalate, valerate and mixtures thereof.

10. A process as in claim 9, wherein said heating is conducted at temperatures between about 100° F. and about 250° F.

11. A process as in claim 10, wherein the ester portion of said cellulose triester is selected from the group consisting of acetate, butyrate, isobutyrate, propionate, phthalate, valerate and mixtures thereof.

References Cited

UNITED STATES PATENTS

| | | | |
|---|---|---|---|
| 3,370,025 | 2/1968 | Salo et al. | 260—15 |
| 2,843,503 | 7/1958 | Salo et al. | 117—85 |
| 2,834,776 | 5/1958 | Malm et al. | 260—225 |
| 2,816,106 | 12/1957 | Malm et al. | 260—230 |

DONALD E. CZAJA, Primary Examiner

R. W. GRIFFIN, Assistant Examiner

U.S. Cl. X.R.

106—169, 173, 178, 183, 198; 117—132, 148, 149, 161, 167, 168; 260—13, 14, 15, 16, 17, 227